United States Patent [19]

Hoover et al.

[11] 4,287,152

[45] Sep. 1, 1981

[54] METHOD OF FOR RETARDING DYE FADING DURING ARCHIVAL STORAGE OF DEVELOPED COLOR PHOTOGRAPHIC FILM

[75] Inventors: Richard B. Hoover; Charles M. Rhodes, both of Huntsville, Ala.

[73] Assignee: The United States of America as represented by the Administrator of the National Aeronautics and Space Administration, Washington, D.C.

[21] Appl. No.: 119,340

[22] Filed: Feb. 7, 1980

[51] Int. Cl.[3] ........................ B01J 19/14; B01J 19/00

[52] U.S. Cl. ........................................ 422/40; 430/17; 430/372

[58] Field of Search ............... 422/9, 10, 40; 430/372, 430/644

[56] References Cited

U.S. PATENT DOCUMENTS

| | | | |
|---|---|---|---|
| 2,605,164 | 7/1952 | Odell | 422/40 |
| 2,647,057 | 7/1953 | Seary et al. | 430/372 |
| 2,661,603 | 12/1953 | Trask | 422/40 X |
| 2,788,274 | 4/1957 | Ranger | 430/372 X |
| 3,188,166 | 6/1965 | Dietz et al. | 422/10 |
| 3,704,088 | 11/1972 | Nagel et al. | 422/10 |
| 4,066,401 | 1/1978 | Solomon | 422/40 |

FOREIGN PATENT DOCUMENTS

| | | | |
|---|---|---|---|
| 2500374 | 7/1976 | Fed. Rep. of Germany | 422/40 |
| 52-29858 | 3/1977 | Japan | 422/40 |

*Primary Examiner*—Barry Richman

*Attorney, Agent, or Firm*—Joseph H. Beumer; John R. Manning; Leon D. Wofford, Jr.

[57] ABSTRACT

Dye fading during archival storage of developed color photographic film (17) is retarded by placing the film in a sealed, opaque vault (10), introducing a dry, pressurized inert gas into the vault while the latter is vented, and sealing the vault after the air within the vault has been purged and replaced by the inert gas. Preferably, the gas is nitrogen; and the vault is stored at a temperature below room temperature to preserve the color photographic emulsions on the film contained within the vault. For short-term storage, sodium thiocyanate pads (36) charged with water are placed within the vault. For long term storage, the interior of the vault is kept at a low relative humidity.

6 Claims, 1 Drawing Figure

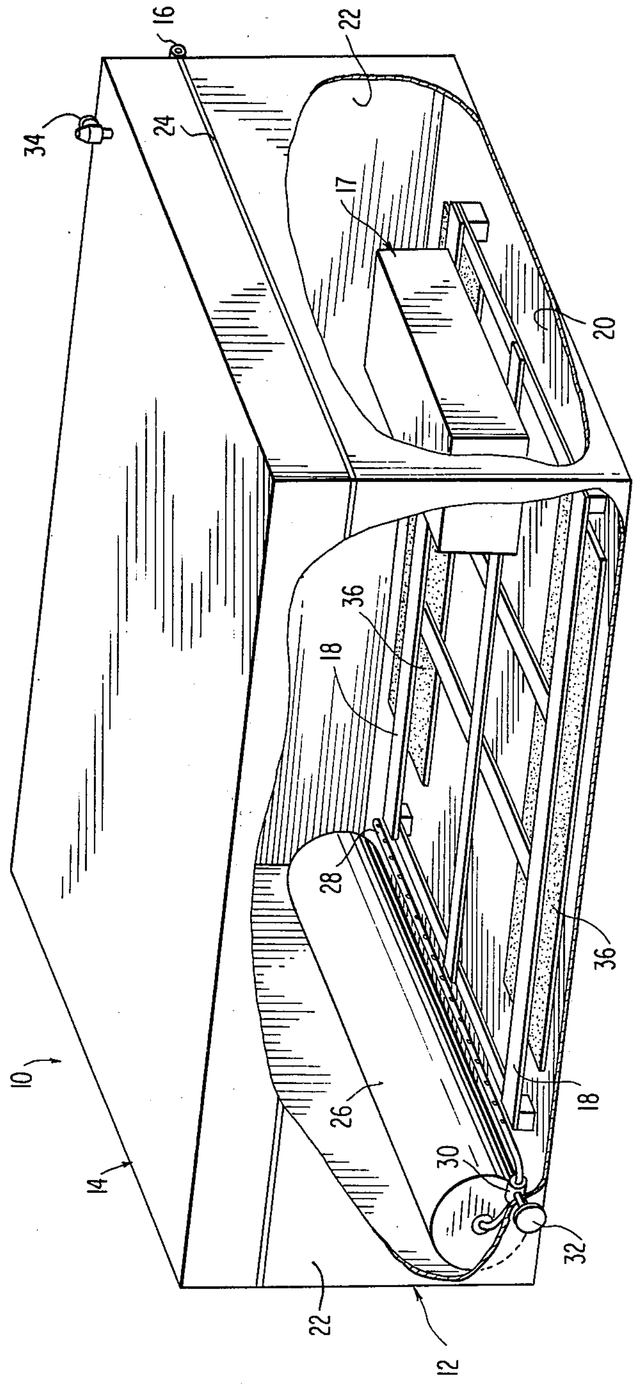
16
22
34
24
17
20
36
18
28
36
10
26
18
30
14
32
22
12

METHOD OF FOR RETARDING DYE FADING DURING ARCHIVAL STORAGE OF DEVELOPED COLOR PHOTOGRAPHIC FILM

DESCRIPTION

TECHNICAL FIELD

The invention described herein was made by employees of the United States Government and may be manufactured and used by, or for, the Government for governmental purposes without payment of any royalties thereon or therefor.

This invention relates to a method of and means for retarding dye fading in the archival storage of developed color photographic film.

BACKGROUND ART

Prior to the present invention, developed photographic film has been stored in totally uncontrolled conditions (e.g., in cabinets by amateur photographers), under limited control of temperature and humidity (e.g., 50 degrees F. and 50% relative humidity such as in the Johnson Space Center film vault), or in cold-dry storage (0 degrees to −10 degrees F. at 15% relative humidity for motion picture film). Where the color film has relatively stable emulsions, such as Kodachrome film and Cibachrome film, the conventional arrangements for storing film are more or less satisfactory. When the film is in the form of high speed transparencies, such as Ektachrome film, it has been found from actual experience that dye fading occurs in a relatively short period of time regardless of the most sophisticated conventional technique for storing the film.

The dry fading that occurs results in a loss of color saturation, a shift in color balance, and a decrease in maximum densities recorded on the film. As a consequence of dye instability, the value and content of scientific information contained on the film can be altered significantly thus destroying the scientific value of the film. Furthermore, fading does not have to proceed to a point where images are totally washed out in order for damage to be considered undesirable.

It is therefore an object of the present invention to provide a new and improved method of and means for archival storage of developed color photographic film wherein dye fading, while not completely inhibited, is significantly retarded as compared to conventional techniques for storing such film.

DISCLOSURE OF INVENTION

According to the present invention, dye fading during archival storage of developed color photographic film is retarded by placing the film in a sealed, opaque vault, introducing a dry, pressurized inert gas into the vault while the latter is vented, and sealing the vault after the air within the vault has been purged and replaced by the inert gas. Preferably, the gas is nitrogen; and the vault is stored at a temperature below room temperature to preserve the color photographic emulsions on the film contained within the vault. For short-term storage, sodium thiocyanate pads charged with water are placed within the vault. For long term storage, the interior of the vault is kept at a low relative humidity.

BRIEF DESCRIPTION OF DRAWINGS

An embodiment of the present invention is shown in the single FIGURE of drawing which is a perspective view, with parts cut away, of a vault for archival storage of developed color photographic film according to the present invention.

BEST MODE FOR CARRYING OUT THE INVENTION

Referring now to the drawing, reference numeral 10 designates a vault for archival storage of developed color film, the vault comprising an aluminum or non-corrosive material container 12 to which a cover 14 is hinged at 16 to allow developed color film 17 to be stored in the container on racks 18 which are spaced from the bottom 20 and sides 22 of the container. Cover 14 fits tightly on the container and a separable fastener (not shown) holds the cover securely in place. Gasket 24, in the form of an O-ring, hermetically seals the cover to the container when the fastener is operated.

Housed within container 12 is a tank 26 containing dry nitrogen gas to which a perforated gas distribution tube 28 is connected by way of valve 30 which has an actuator handle 32 extending through a side wall 22 of the container. In this way, the valve can be selectively opened or closed from the exterior of the container to control the input of nitrogen gas into the vault. In addition, a selectively operable valve 34 is provided in the vault, preferably in the cover, for selectively venting the vault and controlling the purging of the air in the vault.

Finally, the vault contains a pair of sodium thiocyanate pads 36 charged with water which are utilized for the purpose of maintaining a relative humidity in the vault in the 40–50% range when relatively short duration storage is desired.

In operation, the developed color photographic film in the form of 35 mm, 70 mm, 100 foot rolls, 8″ by 10″ sheets, or other format film, is inserted in the container through the open cover. The film rests on the racks 18 spaced from the bottom and sides of the container. Generally, the sodium thiocyanate pads will be charged with water and the cover 14 closed in order to hermetically seal the vault. Handle 32 can then be selectively operated for the purpose of introducing dry nitrogen gas from tank 26 into the sealed vault. At the same time, valve 34 is opened in order for the dry nitrogen to purge the air within the vault. After the air in the vault is purged and replaced by nitrogen at pressure greater than mospheric, valve 34 is closed as is valve 30. The vault is now charged with pressurized nitrogen and the developed color photographic film can be stored at room temperature. Optionally, the vault is placed in an environment which is below room temperature. The nitrogen atmosphere effectively prevents oxidation of the dyes in the emulsions and permits long term storage without significant fading of the dyes.

In the event that relatively long term storage is desired, the procedure for sealing the developed color photographic film in the vault is the same as described above, except that the sodium thiocyanate pads are not utilized. Instead, the film is stored at relatively low humidity at a temperature of around 50 degrees F. Under these conditions of storage, the vault should be allowed to return to room temperature before reopening; usually one to two days should be allowed for the film to return to its condition of 40–50% relative humidity before use in order to avoid cracking of the emulsion on the film.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

We claim:

1. A method for retarding dye fading during archival storage of developed color photographic film comprising the steps of:
   (a) placing the film in a sealed opaque vault;
   (b) venting the vault;
   (c) introducing a dry, pressurized inert gas into the vault while the latter is vented; and
   (d) sealing the vault after the air in the vault is purged and replaced by the inert gas.

2. A method for retarding dye fading during archival storage of developed color photographic film according to claim 1 wherein the gas is nitrogen and the interior of the vault is maintained at a humidity of 40–50% by inclusion of water-charged pads of sodium thiocyanate therein.

3. A method for retarding dye fading during archival storage of developed color photographic film according to claim 1 wherein the gas is dry nitrogen.

4. A method for retarding dye fading during archival storage of developed color photographic film according to claim 3 including the step of storing the vault at a temperature below room temperature.

5. A method for retarding dye fading during archival storage of developed color photographic film according to claim 4 including the step of reopening the vault only after its contents have been returned to room temperature.

6. A method for retarding dye fading during archival storage of developed color photographic film according to claim 5 including the step of introducing moisture into the vault to return the relative humidity therein to the range 40–50% before using the film.

* * * * *